(12) United States Patent
Allis

(10) Patent No.: US 6,581,292 B2
(45) Date of Patent: Jun. 24, 2003

(54) VEGETATION TRIMMER APPARATUS

(76) Inventor: George E. Allis, 82 Sandpit Rd., Lumberton, NC (US) 28358

( * ) Notice: Subject to any disclaimer, the term of this patent is extended or adjusted under 35 U.S.C. 154(b) by 0 days.

(21) Appl. No.: 10/222,375

(22) Filed: Aug. 16, 2002

(65) Prior Publication Data

US 2003/0033718 A1 Feb. 20, 2003

Related U.S. Application Data

(60) Provisional application No. 60/312,988, filed on Aug. 17, 2001.

(51) Int. Cl.[7] .............................................. A01D 50/00
(52) U.S. Cl. ......................................... 30/276; 56/12.7
(58) Field of Search ...................... 30/276, 347; 56/12.7

(56) References Cited

U.S. PATENT DOCUMENTS

| | | |
|---|---|---|
| 4,043,037 A | 8/1977 | Okamoto et al. |
| 4,062,114 A | 12/1977 | Luick |
| 4,199,926 A | 4/1980 | Petty |
| 4,411,069 A * | 10/1983 | Close et al. ................ 30/276 |
| 5,147,145 A | 9/1992 | Facey et al. |
| 5,758,424 A | 6/1998 | Iacona et al. |
| 5,887,348 A | 3/1999 | Iacona et al. |
| 5,896,666 A | 4/1999 | Iacona et al. |
| 6,003,210 A | 12/1999 | Facey et al. |
| 6,058,574 A | 5/2000 | Facey et al. |
| 6,347,455 B2 | 2/2002 | Brant et al. |

* cited by examiner

*Primary Examiner*—Douglas D. Watts
(74) *Attorney, Agent, or Firm*—John F. Letchford; Klehr, Harrison, Harvey, Branzburg & Ellers, LLP

(57) ABSTRACT

A motorized vegetation trimmer apparatus comprising an elongate main handle to which is connected a motor that rotatably drives a trimmer head located at a distal end of the handle. The trimmer head carries one or more radially outwardly projecting cutting members which cut vegetation as the trimmer head rotates. Each cutting member comprises a finite length of flexible strand. The cutting member is releasably gripped by a one-way gripping mechanism including a reciprocating gripping member and a compression spring that biases the gripping member into gripping contact with the strand.

18 Claims, 5 Drawing Sheets

VEGETATION TRIMMER APPARATUS

CROSS-REFERENCE TO RELATED APPLICATION

This application claims the benefit of U.S. Provisional Patent Application Ser. No. 60/312,988, entitled VEGETATION CUTTING HEADS filed Aug. 17, 2001.

FIELD OF THE INVENTION

The present invention relates in general to vegetation trimmer apparatus and in particular to vegetation trimmer apparatus having flexible cutting members.

BACKGROUND OF THE INVENTION

Internal combustion engine and electric motor powered vegetation trimmers are commonly used to cut and trim grass, weeds, brush and other vegetation. The typical motorized trimmer comprises an elongate handle which to which is connected an internal combustion or electric motor which rotatably drives a trimmer head located at a distal end of the handle. The trimmer head, in turn, carries one or more radially outwardly projecting cutting members or blades which cut the vegetation as the trimmer head rotates. In heavy duty internal combustion trimmers, the trimmer head may include one more flexible or rigid cutting means. If rigid, the cutting means assume the form of blades fabricated from plastic and/or metal and often having corrugations about their peripheral cutting edges. The blades are pivotally attached to the trimmer head such they yield when they contact hard objects, thereby prolonging the service lives of the blades. Rigid blades are normally used to cut very dense vegetation and may cause considerable injury to the trimmer operator or other persons should they accidentally be struck by the blades during operation of the trimmer.

In lighter duty electric trimmers, the cutting means may be fabricated as a continuous strand flexible monofilament plastic line wrapped about a spool contained within the trimmer head. In such devices, the plastic line is typically selectively dispensed by the centrifugal force generated by rotation of the trimmer head. A disadvantage common to these sorts of devices is that the line frequently becomes jammed when a user attempts to dispense fresh line from the spool. When this occurs, the user must stop the trimming operation, disassemble the trimmer head, fix the jam and reassemble the trimmer head before resuming trimming. Such repeated disruption can be quite frustrating and time-consuming.

Recently, some vegetation trimmers have come to employ finite lengths of monofilament plastic line or string that can be quickly and easily replaced as they become broken or worn without need to resort to disassembly and reassembly of the trimmer head. Each of these designs uses a one-way gripping means that permits withdrawal of a worn or broken string from a central portion of the trimmer head and insertion of a new replacement string through a peripheral wall of the trimmer head to replace the old string. Once inserted into the trimmer head, the one-way gripping means resists withdrawal of the new string in the direction opposite that to which it was inserted into the trimmer head. More particularly, when a new length of trimmer string is inserted through the peripheral wall of the trimmer head it engages a pivotable cam gripping member. The user then continues insertion of the string until a desired length of the string projects from the periphery of the trimmer head for vegetation cutting purposes. When the user releases the string, the cam is biased by a spring into gripping contact with the string. And, when the user reactivates the device, the rotation of the trimmer head generates centrifugal force that enhances the gripping force of the cam. Examples of such devices are provided in U.S. Pat. Nos. 5,758,424; 5,887,348; 5,896,666 and 6,347,455.

Although generally suitable for their intended purposes, the gripping means disclosed by these patents, which employ torsion or tension springs to bias the pivoted cams, constitute an arrangement that is unduly complex in design and less than desirable in terms of cost and ease of manufacture.

An advantage exists, therefore, for a vegetation trimmer apparatus including a rotatable trimmer head for receiving at least one finite length of replaceable trimmer string that is releasably engageable by one-way gripping means of simple design and construction that is economical to manufacture, long-lasting, and adaptable to a wide variety of trimmer head designs.

Other details, objects and advantages of the present invention will become apparent as the following description of the presently preferred embodiments and presently preferred methods of practicing the invention proceeds.

SUMMARY OF THE INVENTION

The present invention provides a motorized vegetation trimmer apparatus comprising an elongate main handle to which is connected an internal combustion or electric motor that rotatably drives a trimmer head located at a distal end of the handle. The trimmer head, in turn, carries one or more radially outwardly projecting cutting means which cut the vegetation as the trimmer head rotates. The trimmer apparatus preferably includes a steering handle attached to the main handle to facilitate guidance of the apparatus during operation.

The cutting means comprises at least one finite length of pliant strand or string. The pliant strand is preferably flexible monofilament plastic of a type used in conventional vegetation trimmer apparatus, e.g., nylon or the like. The cutting means is releasably gripped by one-way gripping means including a reciprocating gripping member and a compression spring that biases the gripping member into gripping contact with the string. The gripping means are uncomplicated in design, reliable in operation, comparatively inexpensive and simple to manufacture, and readily adaptable to a wide variety of trimmer head designs.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
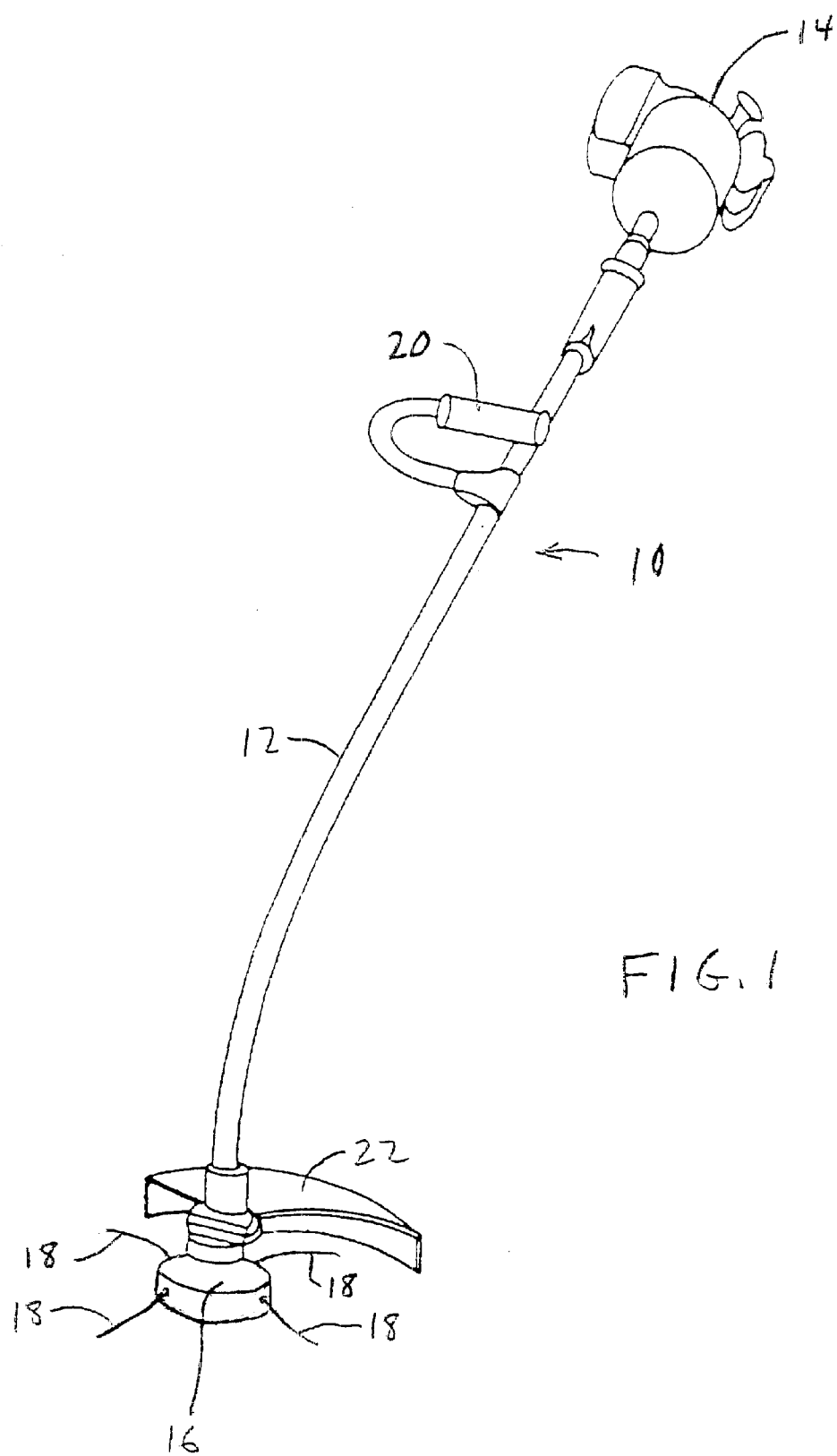
FIG. 1 is a perspective view of a motorized vegetation trimmer apparatus including a rotatable trimmer head and a plurality of flexible cutting means according to the present invention.

Referring to the drawings, wherein like references indicate like or similar elements throughout the several views, there is shown in FIG. 1 a motorized vegetation trimmer apparatus 10 according to the present invention. Apparatus 10 comprises an elongate main handle 12 which to which is connected an internal combustion or electric motor 14 which rotatably drives a trimmer head 16 located at a distal end of the handle. Trimmer head 16 carries one or more radially outwardly projecting cutting means 18 which cut the vegetation as the trimmer head rotates. Preferably, trimmer apparatus 10 includes a steering handle 20 attached to the main handle 12 to facilitate guidance of the apparatus during operation. A shield 22 is also desirably provided for the operator's safety.

Figure 2:
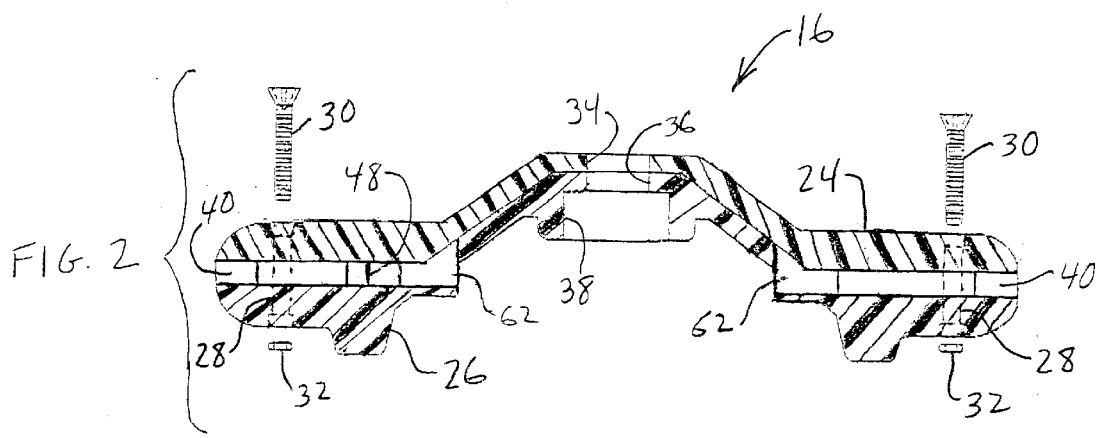
FIG. 2 is partially exploded and elevational cross-section view of a first embodiment of a trimmer head constructed according to the present invention.

Referring to FIG. 2 there is shown a first presently preferred embodiment of a trimmer head 16 according to the invention that is used for cutting vegetation in conjunction with an internal combustion or electric powered trimmer apparatus such as apparatus 10 shown in FIG. 1. Trimmer head 16 preferably comprises a rigid molded plastic first or "top" body member 24 and a rigid molded plastic second or "bottom" body member 26. Upon installation of the trimmer line gripping means described hereinafter, body members 24,26 (and their counterparts in FIGS. 5–8) may be permanently or releasably fastened to one another. To facilitate maintenance or repair of the trimmer head 16, body members 24,26 may be releasably connected by cooperating snaps, latches or, as illustrated, a plurality of aligned bores 28 provided in each of the body members that receive a corresponding number of conventional bolts/screws 30 and nuts 32. As used herein, the terms "top" and "bottom" refer to the relative positions that body members 24,26 (and their counterparts in FIGS. 5–8) would assume when trimmer head 16 is "in use," i.e., when attached to the rotating drive shaft of a conventional internal combustion or electric powered trimmer apparatus.

In order to attach trimmer head 16 to the rotating drive shaft of a trimmer apparatus, body members 24,26 (and their counterparts in FIGS. 5–8) are provided with aligned central bores, identified respectively by reference numerals 34 and 36 in FIG. 2, of a diameter sufficient to receive the unillustrated drive shaft. The underside of second body member 26 (and its counterpart in FIGS. 5–8) is preferably molded so as to provide an integral central socket, identified by reference numeral 38 in FIG. 2, for closely receiving an unillustrated conventional hexagonal or other bolt that is adapted to threadedly mate with the drive shaft and releasably attach trimmer head 16 to the drive shaft. The purpose of socket 38 is assure that trimmer head 16 is rotatably driven in unison with the drive shaft. Socket 38 prevents slippage of trimmer head 16 with respect to the drive shaft in the event that the cutting members of trimmer head 16 (described below) encounter solid objects or dense or otherwise difficult to cut grass, weeds or other vegetation.

Trimmer head 16 includes at least one passageway 40 for releasably receiving at least one cutting member 18 in the form of a finite length (approximately 4–12" in length) of flexible monofilament plastic trimmer line, typically nylon strand. Each cutting member 18 (and its counterpart(s) in FIGS. 5–8) may be any constructed as a flexible yet rugged filament, string or wire. Preferably, each cutting member is a commercially available flexible monofilament plastic trimmer line of any suitable type and cross-sectional configuration, e.g., 0.065, 0.080, 0.095, 0.105, 0.12, 0.13 or 0.15 gauge nylon trimmer line or the like, which is currently used as cutting filaments in conventional vegetation trimmer apparatus.

Although a minimum of one cutting member 18 and passageway 40 may be used in trimmer head 16 (and its counterparts in FIGS. 5–8), according to a presently preferred embodiment, two oppositely directed cutting members 18 are deployed in the trimmer head. Furthermore, it will be understood that trimmer head 16 (and its counterparts in FIGS. 5–8) may include three or more preferably equiangularly spaced passageways for accommodating a corresponding number of cutting members.

Figure 3:
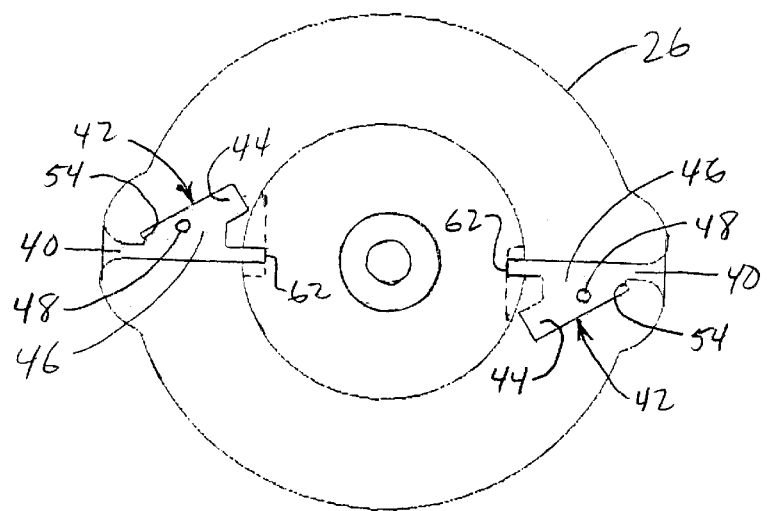
FIG. 3 is a top plan view of a first embodiment of a bottom body member of a trimmer head constructed according to the present invention.

As seen in FIG. 3, for each cutting member 18, body member 26 is molded so as to form a chamber 42 for receiving means for releasably gripping cutting members 18. Each of the chambers 42 is in communication with and disposed at an acute angle with respect to its respective passageway 40.

Each chamber preferably has a narrow aft portion 44 and an enlarged fore portion 46. Depending on space considerations associated with a particular trimmer head design, the acute angle of chamber 42 may range from about 10° to about 80° with respect to the passageway 40. As explained in connection with the discussion of FIG. 4 below, an upstanding guide pin 48 (shown also in FIG. 1) is preferably molded into body member 26 in fore portion 46 of chamber 42.

Figure 4:
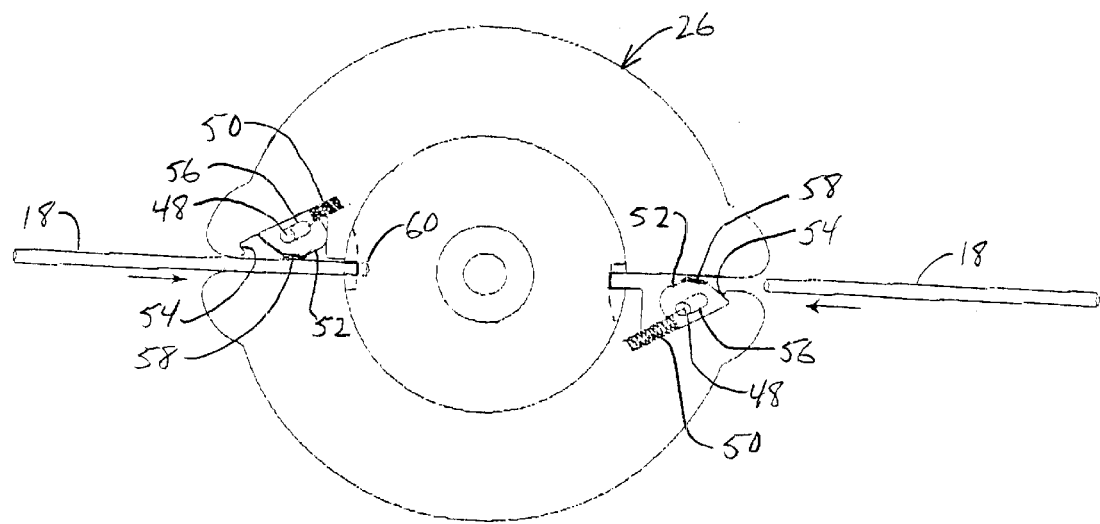
FIG. 4 is a top plan view of the trimmer head bottom body member of FIG. 3 depicting a first embodiment of trimmer line gripping means according to the present invention disposed therein.

As illustrated in FIG. 4, according to a first presently preferred embodiment, each of the means for releasably gripping cutting member 18 includes a compression spring 50 adapted to be received within aft portion 44 of chamber 42 and a reciprocally slidable, generally "D-shaped" rigid cleat member 52 adapted to be received within fore portion 46 of chamber 42. One end of compression spring 50 is seated against a rear wall of aft portion 44 of chamber 42 whereas the opposite end of compression spring 50 is seated against cleat member 52. FIGS. 3 and 4 reveal that body member 26 is preferably molded to include a lip 54 which functions as a stop for cleat member 52 when no cutting member 18 is present in passageway 40. And, compression spring 50 is preferably selected to have a length such that it is at least slightly compressed when seated in the aft portion 44 of chamber 42 between the rear wall of aft portion 44 and cleat member 52, even when no cutting member 18 is present in passageway 40.

Additionally, cleat member 52 is provided with an elongated slot 56 for receiving guide pin 48. This cooperating pin and slot arrangement between the trimmer head 16 and cleat member 52 assures that the cleat member is restrained to smooth, linear reciprocating motion at the aforementioned acute angle and prevents disengagement of the cleat member from compression spring 50 in the event the cutting member 18 should experience violent impacts arising from contact with solid objects and/or especially dense vegetation. And, as indicated by reference numeral 58, the face of cleat member that is adapted to contact cutting member 18 is preferably provided with at least one protrusion means such as one or more ribs or corrugations, knurling or other textured surfacing for enhancing gripping of the cutting member 18 by cleat member 52.

In order to position a cutting member 18 in trimmer head 16, a cutting member is inserted into an opening in the periphery of body member 12 and passed along passageway 40 formed therein until the cutting member comes into contact with face 58 of cleat member 52. The cutting member 18 is then further inserted by the user such that the free end of the cutting member 18 projects a desired distance from the periphery of the trimmer head 16. As the cutting member 18 passes the cleat member 52 it displaces the cleat member in chamber 40 along the aforementioned acute angle. The user then releases the cutting member 18 and the cleat member 52 settles into gripping contact with cutting member 18 under the influence of compression spring 50. If gripping enhancement means 58 is present at the face of cleat member 52, it is preferable that the last protrusion of the gripping enhancement means in the direction of insertion of cutting member 18 be the most salient in order to enhance the biting effect of the cleat member 52 on the cutting member. This biting effect is further enhanced by centrifugal force when trimmer head 16 is rotatably driven by the drive shaft of the internal combustion or electric powered apparatus 10.

In order to replace a damaged or worn cutting member 18, the user stops the trimmer apparatus 10 and grasps the inner end 60 (FIG. 4) of the cutting member 18 from the underside of body member 12 and withdraws the cutting member 18 through a discharge opening 62 of passageway 40 (FIGS. 2 and 3). A new cutting member 18 then may be inserted in its place as described above.

Figure 5:
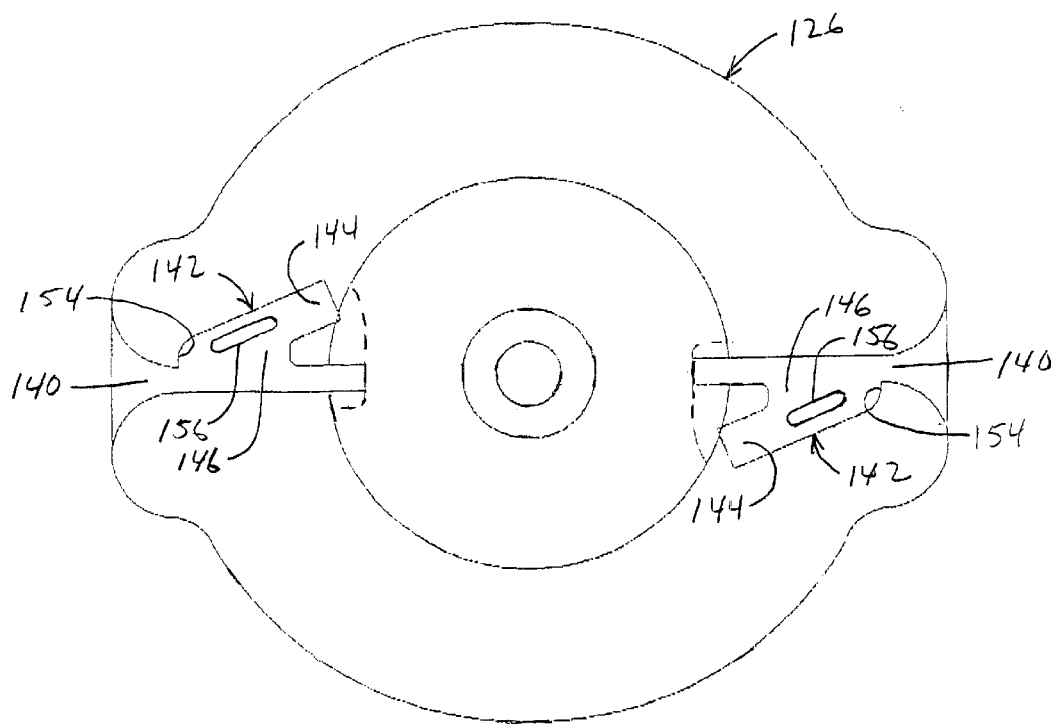
FIG. 5 is a top plan view of a further embodiment of a bottom body member of a trimmer head constructed according to the present invention.
Figure 6:
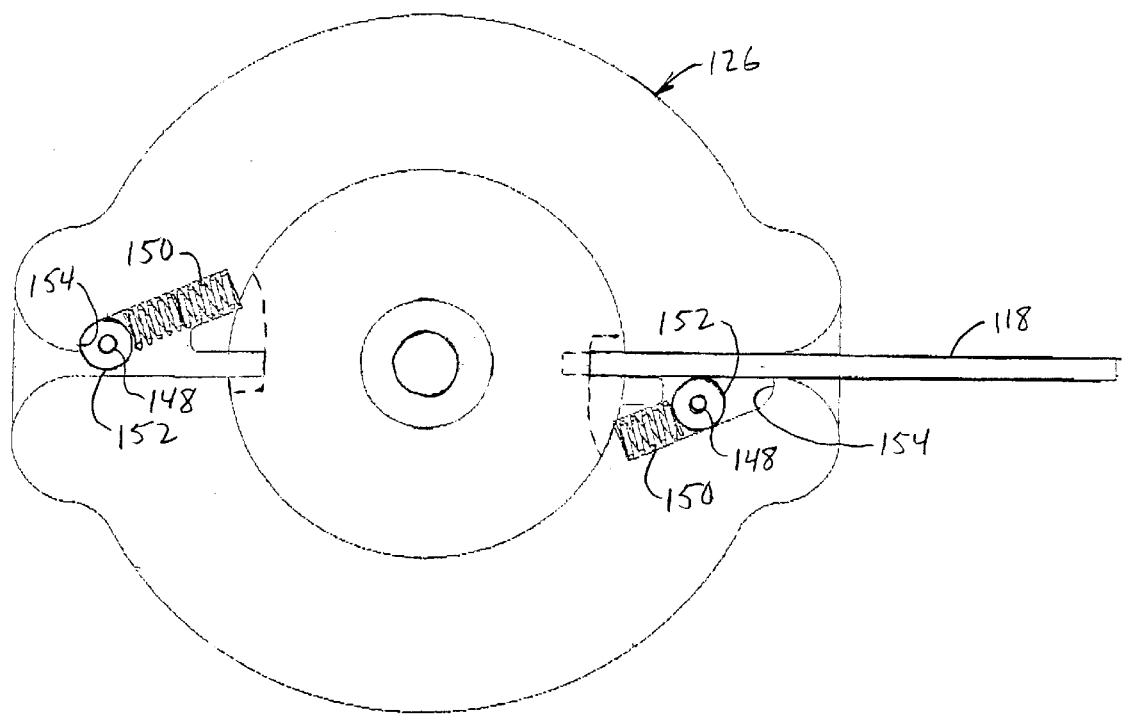
FIG. 6 is a top plan view of the trimmer head bottom body member of FIG. 5 depicting a further embodiment of trimmer line gripping means according to the present invention disposed therein.

FIGS. 5 and 6 depict a further presently preferred embodiment of the trimmer head and trimmer line gripping means according to the present invention. More particularly, FIG. 5 is a top plan view of a bottom body member 126 of a trimmer head that, like trimmer head 16 of FIG. 2, may be attached to the rotating drive shaft of a conventional internal combustion or electric powered trimmer apparatus such as trimmer apparatus 10 of FIG. 1. Indeed, bottom body member 126 may be fastened to a trimmer head top body member of the same or similar construction as top body member 24 of FIG. 2.

Body member 126 is molded so as to form a chamber 142 for receiving means for releasably gripping cutting members 118 (FIG. 6). Each of the chambers 142 is in communication with and disposed at an acute angle with respect to its respective passageway 140. Each chamber preferably has a narrow aft portion 144 and an enlarged fore portion 146. Depending on space considerations associated with a particular trimmer head design, the acute angle of chamber 142 may range from about 10° to about 80° with respect to the passageway 140.

As illustrated in FIG. 6, each of the means for releasably gripping cutting member 118 includes a compression spring 150 adapted to be received within aft portion 144 of chamber 142 and a reciprocally slidable, generally disk-shaped rigid cleat member 152 adapted to be received within fore portion 146 of chamber 142. One end of compression spring 150 is seated against a rear wall of aft portion 144 of chamber 142 whereas the opposite end of compression spring 150 is seated against cleat member 152. FIGS. 5 and 6 reveal that body member 126 is preferably molded to include a lip 154 which functions as a stop for cleat member 152 when no cutting means 118 is present in passageway 140. And, compression spring 150 is preferably selected to have a length such that it is at least slightly compressed when seated in the aft portion 144 of chamber 142 between the rear wall of aft portion 144 and cleat member 152, even when no cutting member 118 is present in passageway 140.

Additionally, cleat member 152 is preferably provided with at least one guide pin 148 projecting from at least one of its upper and lower faces. Each guide pin 148 is adapted for engagement with an elongated slot 156 provided in at least one of bottom body member 126 and the unillustrated top body member. The elongated slots 156 are oriented in a direction parallel to the acute angle of chamber 142. This cooperating pin and slot arrangement between the trimmer head and cleat member 152 assures that the cleat member is restrained to smooth, linear reciprocating motion at the aforementioned acute angle and prevents disengagement of the cleat member from compression spring 150 in the event the cutting member 118 should experience violent impacts arising from contact with solid objects and/or especially dense vegetation. Further, the peripheral face of cleat member 152 that is adapted to contact cutting member 18 is preferably provided with means for enhancing gripping of the cutting member 118 by the cleat member.

Figure 7:
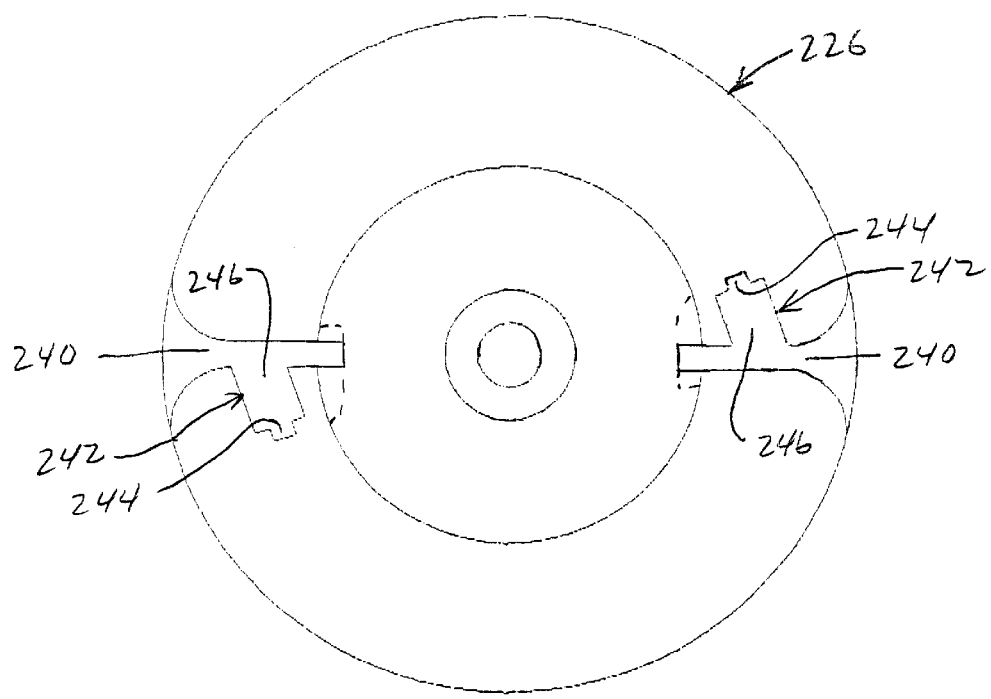
FIG. 7 is a top plan view of a further embodiment of embodiment of a bottom body member of a trimmer head constructed according to the present invention.
Figure 8:
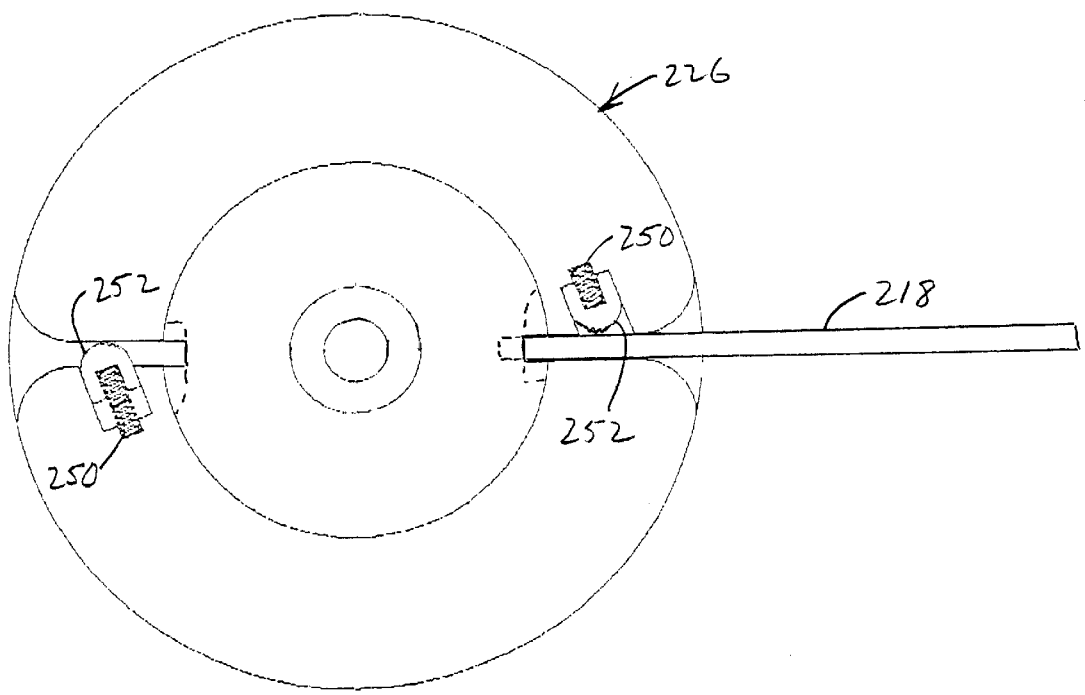
FIG. 8 is a top plan view of the trimmer head bottom body member of FIG. 7 depicting a further embodiment of trimmer line gripping means according to the present invention disposed therein.

FIGS. 7 and 8 depict a further presently preferred embodiment of the trimmer head and trimmer line gripping means according to the present invention. More particularly, FIG. 7 is a top plan view of a bottom body member 226 of a trimmer head that, like trimmer head 16 of FIG. 2, may be attached to the rotating drive shaft of a conventional internal combustion or electric powered trimmer apparatus such as trimmer apparatus 10 of FIG. 1. Indeed, bottom body member 226 may be fastened to a trimmer head top body member of the same or similar construction as top body member 24 of FIG. 2.

Body member 226 is molded so as to form an irregularly shaped chamber 242 for receiving means for releasably gripping cutting members 218 (FIG. 8). Each of the chambers 242 is in communication with and disposed at an acute angle with respect to its respective passageway 240. Each chamber preferably has a narrow aft portion 244 and an enlarged fore portion 246. Depending on space considerations associated with a particular trimmer head design, the acute angle of chamber 242 may range from about 10° to about 80° with respect to the passageway 240.

As illustrated in FIG. 8, each of the means for releasably gripping cutting member 218 includes a compression spring 250 adapted to be received within aft portion 244 of chamber 242 and a reciprocally slidable, generally "U-shaped" rigid cleat member 252 adapted to be received within fore portion 246 of chamber 242. One end of compression spring 250 is seated against a rear wall of aft portion 244 of chamber 242 whereas the opposite end of compression spring 250 is seated in a recessed notch in cleat member 252. Compression spring 250 is preferably selected to have a length such that it is at least slightly compressed when seated in the aft portion 244 of chamber 242 between the rear wall of aft portion 244 and cleat member 252, even when no cutting member 218 is present in passageway 240.

Additionally, cleat member 252 is dimensioned such that it is closely received in the fore portion 246 of chamber 242. This close cooperating arrangement between the trimmer head and cleat member 52 assures that the cleat member is restrained to smooth, linear reciprocating motion at the aforementioned acute angle and prevents disengagement of the cleat member from compression spring 250 in the event the cutting member 218 should experience violent impacts arising from contact with solid objects and/or especially dense vegetation. Further, the face of cleat member 252 that is adapted to contact cutting member 218 is preferably provided with means for enhancing gripping of the cutting member 218 by the cleat member.

In each of the embodiments of the invention disclosed in FIGS. 5–8, worn cutting members are withdrawn from the trimmer head and new cutting members inserted into the trimmer head in the manner described above in connection with FIGS. 3 and 4.

In all of the presently preferred embodiments described herein, the trimmer line gripping means of the present invention is essentially constructed as a reciprocating cleat member that is biased via a compression spring into gripping contact with a flexible vegetation cutting member. In contrast, conventional rotating trimmer heads incorporating cam-type trimmer line gripper devices require the provision of pivot pins or similar members to support the pivoting movement of their gripping cams as well multiple anchorages for the tension or torsion springs that bias such cams. The inclusion of such components adds not only to the complexity and cost of such devices but also introduces the potential for increased maintenance requirements. It will be appreciated, therefore, that the present invention provides a simple, reliable and comparatively inexpensive construction that may be readily adapted to virtually any rotatable trimmer head design.

Although the invention has been described in detail for the purpose of illustration, it is to be understood that such detail is solely for that purpose and that variations can be made therein by those skilled in the art without departing from the spirit and scope of the invention as defined by the claims.

What is claimed is:

1. A vegetation trimmer head adapted to be rotatably driven by a drive shaft of a motorized vegetation trimmer apparatus, said vegetation trimmer head comprising:
    a body including means for enabling releasable attachment of said body to a drive shaft of a motorized vegetation trimmer apparatus;
    at least one passageway in said body for receiving a vegetation cutting member of finite length;
    at least one chamber in said body in communication with said at least one passageway; and
    gripping means disposed in said at least one chamber, said gripping means comprising a cleat member and a compression spring for biasing said cleat member into gripping engagement with a vegetation cutting member, said cleat member being reciprocally movable in said chamber at an acute angle with respect to said at least one passageway, wherein said at least one chamber comprises a fore portion and an aft portion, wherein said cleat member is disposed in said fore portion, and wherein said compression spring is disposed between and in contact with said cleat member and a rear wall of said aft portion.

2. The vegetation trimmer head of claim 1 wherein said at least one chamber is disposed at said acute angle.

3. The vegetation trimmer head of claim 1 wherein said body further comprises a lip associated said at least one chamber, said lip functioning as a stop for said cleat member when no vegetation cutting member is present in passageway.

4. The vegetation trimmer head of claim 1 further comprising means for restraining said cleat member to reciprocating motion at said acute angle and for preventing disengagement of said cleat member from said compression spring in the event a vegetation cutting member should experience violent impacts during rotation of said trimmer head.

5. The vegetation trimmer head of claim 4 wherein said means for restraining said cleat member to reciprocating motion at said acute angle and for preventing disengagement of said cleat member from said compression spring comprise cooperating guide pin and slot means carried by said body and said cleat member.

6. The vegetation trimmer head of claim 1 wherein said cleat member is generally D-shaped.

7. The vegetation trimmer head of claim 1 wherein said cleat member is generally disk shaped.

8. The vegetation trimmer head of claim 1 wherein said cleat member is generally U-shaped.

9. A vegetation trimmer apparatus comprising:
    an elongate handle;
    a motor connected to said handle; and
    a rotatable trimmer head connected to said handle and rotatably driven by said motor, said trimmer head comprising:
        a body including means for enabling releasable attachment of said body to a drive shaft of a motorized vegetation trimmer apparatus;
        at least one passageway in said body for receiving a vegetation cutting member of finite length;
        at least one chamber in said body in communication with said at least one passageway; and
        gripping means disposed in said at least one chamber, said gripping means comprising a cleat member and a compression spring for biasing said cleat member into gripping engagement with a vegetation cutting member, said cleat member being reciprocally movable in said chamber at an acute angle with respect to said at least one passageway, wherein said at least one chamber comprises a fore portion and an aft portion, wherein said cleat member is disposed in said fore portion, and wherein said compression spring is disposed between and in contact with said cleat member and a rear wall of said aft portion.

10. The vegetation trimmer apparatus of claim 9 wherein said at least one chamber is disposed at said acute angle.

11. The vegetation trimmer apparatus of claim 9 wherein said body further comprises a lip associated said at least one chamber, said lip functioning as a stop for said cleat member when no vegetation cutting member is present in passageway.

12. The vegetation trimmer apparatus of claim 9 further comprising means for restraining said cleat member to reciprocating motion at said acute angle and for preventing disengagement of said cleat member from said compression spring in the event a vegetation cutting member should experience violent impacts during rotation of said trimmer head.

13. The vegetation trimmer apparatus of claim 12 wherein said means for restraining said cleat member to reciprocating motion at said acute angle and for preventing disengagement of said cleat member from said compression spring comprise cooperating guide pin and slot means carried by said body and said cleat member.

14. The vegetation trimmer apparatus of claim 9 wherein said cleat member is generally D-shaped.

15. The vegetation trimmer apparatus of claim 14, wherein said cleat member is generally disk shaped.

16. The vegetation trimmer apparatus of claim 9 wherein said cleat member is generally U-shaped.

17. A vegetation trimmer head adapted to be rotatably driven by a drive shaft of a motorized vegetation trimmer apparatus, said vegetation trimmer head comprising:

a body including means for enabling releasable attachment of said body to a drive shaft of a motorized vegetation trimmer apparatus;

at least one passageway in said body for receiving a vegetation cutting member of finite length;

at least one chamber in said body in communication with said at least one passageway;

gripping means disposed in said at least one chamber, said gripping means comprising a cleat member and a compression spring for biasing said cleat member into gripping engagement with a vegetation cutting member, said cleat member being reciprocally movable in said chamber at an acute angle with respect to said at least one passageway; and protrusion means provided at a face of said cleat member adapted for contacting a vegetation cutting member for enhancing gripping of the vegetation cutting member, said protrusion means comprising a plurality of protrusions wherein the last of said protrusions in the direction of insertion of a vegetation cutting member into said body is the most salient of said protrusions.

18. A vegetation trimmer apparatus comprising:

an elongate handle;

a motor connected to said handle; and a rotatable trimmer head connected to said handle and rotatably driven by said motor, said trimmer head comprising:

a body including means for enabling releasable attachment of said body to a drive shaft of a motorized vegetation trimmer apparatus;

at least one passageway in said body for receiving a vegetation cutting member of finite length;

at least one chamber in said body in communication with said at least one passageway;

gripping means disposed in said at least one chamber, said gripping means comprising a cleat member and a compression spring for biasing said cleat member into gripping engagement with a vegetation cutting member, said cleat member being reciprocally movable in said chamber at an acute angle with respect to said at least one passageway; and protrusion means provided at a face of said cleat member adapted for contacting a vegetation cutting member for enhancing gripping of the vegetation cutting member, said protrusion means comprising a plurality of protrusions wherein the last of said protrusions in the direction of insertion of a vegetation cutting member into said body is the most salient of said protrusions.

\* \* \* \* \*

UNITED STATES PATENT AND TRADEMARK OFFICE
CERTIFICATE OF CORRECTION

PATENT NO. : 6,581,292 B2
DATED : June 24, 2003
INVENTOR(S) : George E. Alliss

It is certified that error appears in the above-identified patent and that said Letters Patent is hereby corrected as shown below:

Title page,
Item [12], "Allis" should read -- Alliss --.
Item [76], Inventor, "Allis" should read -- Alliss --.

Signed and Sealed this

Twenty-fourth Day of January, 2006

JON W. DUDAS
*Director of the United States Patent and Trademark Office*